US012610179B2

(12) United States Patent
Dan

(10) Patent No.: US 12,610,179 B2
(45) Date of Patent: Apr. 21, 2026

(54) SPEAKER DEVICE

(71) Applicant: AAC Kaitai Technologies (Wuhan) CO., LTD., Wuhan (CN)

(72) Inventor: Qiang Dan, Wuhan (CN)

(73) Assignee: AAC Kaitai Technologies (Wuhan) CO., LTD., Wuhan (CN)

( * ) Notice: Subject to any disclaimer, the term of this patent is extended or adjusted under 35 U.S.C. 154(b) by 146 days.

(21) Appl. No.: 18/791,467

(22) Filed: Aug. 1, 2024

(65) Prior Publication Data

US 2025/0254464 A1 Aug. 7, 2025

Related U.S. Application Data

(63) Continuation of application No. PCT/CN2024/075128, filed on Feb. 1, 2024.

(51) Int. Cl.
*H04R 1/28* (2006.01)
*H04R 1/02* (2006.01)

(52) U.S. Cl.
CPC ........... *H04R 1/2834* (2013.01); *H04R 1/025* (2013.01)

(58) Field of Classification Search
CPC .. H04R 1/1016; H04R 1/2826; H04R 1/1008; H04R 1/1075; H04R 1/105; H04R 1/2811; H04R 2460/11; H04R 19/00; H04R 19/01; H04R 19/02; H04R 19/013; H04R 19/005; H04R 1/025; H04R 1/2834; H04R 2400/11; H04R 2499/11; H04R 2217/03; H04R 17/00; H04R 1/403; H04R 2201/003; H04R 7/06; H04R 17/02; B81C 1/00158; B81B 2201/0257; B81B 2203/0127; H10N 30/706; H10N 30/2047; G10K 15/04; H02N 1/006
See application file for complete search history.

(56) References Cited

U.S. PATENT DOCUMENTS

2017/0201192 A1* 7/2017 Tumpold ................. H04R 7/06

FOREIGN PATENT DOCUMENTS

JP 2007005872 A * 1/2007
WO WO-2013121489 A1 * 8/2013 ............. H04R 17/00

* cited by examiner

*Primary Examiner* — Carolyn R Edwards
*Assistant Examiner* — Julie X Dang
(74) *Attorney, Agent, or Firm* — Wiersch Law Group

(57) ABSTRACT

The present invention provides a speaker device having a support structure with a support body provided with a sound chamber and an annular sound hole. The speaker device further includes an ultrasonic sound emitting unit for emitting symmetrical ultrasonic waves, and a demodulation structure with a diaphragm and multiple fixed parts. The diaphragm is spaced apart from the sound hole. The ultrasonic waves emitted by the ultrasonic sound emitting unit drive the demodulation structure to vibrate, adjusting the size of the gap. Compared with the prior art, the speaker device of the present invention has high sound wave demodulation efficiency, good improvement in vibration system amplitude, and excellent acoustic performance.

7 Claims, 8 Drawing Sheets

SPEAKER DEVICE

TECHNICAL FIELD

The present invention relates to the field of electroacoustic transducers, more particularly to a speaker device.

BACKGROUND

A speaker device is a transducer that converts electrical signals into sound signals, and is also called loudspeaker. Loudspeakers are widely used in portable electronic products, such as mobile phones, to convert audio signals into sound for playback. The miniaturization of portable electronic products is driving the miniaturization of loudspeakers. Sound pressure level (SPL) and total harmonic distortion (THD) are important indicators of acoustic performance in loudspeakers.

The speaker of the relevant technology includes a support, an ultrasonic vibration sound emitting unit fixed inside the support, and a baffle set at a distance from the ultrasonic vibration sound emitting unit on one side of the support. There is a through hole formed through the support near the baffle, and a narrow gap is formed between the baffle and the support. The narrow gap communicates with the through hole. Modulated symmetrical ultrasonic sound waves are emitted through the ultrasonic vibration sound emitting unit, and passing through the narrow gap with strong nonlinearity will cause distortion to the symmetrical ultrasonic waves, thereby demodulating audible sound. However, the efficiency of demodulating audible sound by the ultrasonic vibration sound emitting unit through the narrow gap is too low, the vibration amplitude is low, and the acoustic performance is poor.

Therefore, it is necessary to provide a new speaker device to address the above technical issues.

SUMMARY

One of the major purposes of the present invention is to provide a speaker device with high efficiency in sound wave demodulation, good effect in amplitude enhancement of the vibrating system, and excellent acoustic performance.

To achieve the purpose mentioned above, the present invention provides a speaker device which comprises a support structure having a support body with a sound chamber and a sound hole penetrating through the support body; an ultrasonic sound emitting unit located in the sound chamber and fixed on an inner peripheral side of the support body for emitting amplitude-modulated ultrasonic waves; and demodulation structure located at one end of the sound hole, fixed to the support structure, and spaced apart from the ultrasonic sound emitting unit along an emitting direction of the ultrasonic sound emitting unit.

The demodulation structure includes a diaphragm, a fixed part extending from the support structure for matching the diaphragm, and a gap formed between the diaphragm and the support structure. The amplitude-modulated ultrasonic wave emitted by the ultrasonic sound emitting unit vibrates the demodulation structure, causing changes of the gap, which demodulates modulated sound waves.

As an improved option, the ultrasonic sound emitting unit generates out-of-plane vibration driven by a characteristic modulation signal, for emitting an amplitude-modulated ultrasonic wave.

As an improved option, the diaphragm of the demodulation structure vibrates driven by the amplitude-modulated ultrasonic wave, and a mechanical resonance frequency of the diaphragm is substantially equivalent to a carrier frequency of the amplitude-modulated ultrasonic wave.

As an improved option, a vibration of the diaphragm causes a geometric dimension change of the gap in at least one direction, resulting in periodic variations of acoustic impedance of the gap.

As an improved option, the amplitude-modulated ultrasonic wave passes through the changing gap for generating an asymmetrically amplitude-modulated ultrasonic wave containing the demodulated modulation sound waves.

The invention also provides a speaker device that comprises a supporting structure comprises a support body with a sound chamber and a sound hole penetrating through the support body; an ultrasonic sound emitting unit, located in the sound chamber, fixed on an inner peripheral side of the support body for emitting amplitude-modulated ultrasonic waves; and a demodulation structure located inside the sound hole, fixed to the support structure, and spaced apart from the ultrasonic sound emitting unit along the sound hole.

The demodulation structure includes a diaphragm, a fixed part extending from the supporting structure matching the diaphragm, and a gap formed between the diaphragm and the supporting structure. The demodulation structure vibrates driven by an ultrasonic wave with amplitude modulation emitted by the ultrasonic sound emitting unit, causing changes of the gap which demodulates the modulated sound waves.

As an improved option, an exiting-entering sound axis of the gap of the demodulation structure is vertical to a vibration direction of the ultrasonic sound emitting unit.

Compared with existing technologies, in the speaker device of the present invention, an ultrasonic sound generation unit is fixed on the inner peripheral side of a support body for emitting amplitude-modulated ultrasonic waves. The demodulation structure is located at one end of the sound hole and fixed to the supporting structure, with the demodulation structure spaced apart from the ultrasonic sound generation unit along the emission direction of the ultrasonic sound generation unit.

The demodulation structure includes a diaphragm, a fixed portion extending from the supporting structure and matching the diaphragm, and a gap formed between the diaphragm and the supporting structure. The demodulation structure vibrates when driven by the amplitude-modulated ultrasonic waves emitted by the ultrasonic sound generation unit, and changes in the gap lead to the demodulation of modulated sound waves. By emitting symmetrical ultrasonic waves through the ultrasonic sound generation unit, the sound pressure of the ultrasonic waves acts on the vibrating demodulation structure, causing it to vibrate and change the size of the gap formed with the sound hole. This modulation alters the ease with which sound waves flow out of the gap, thereby demodulating audible sound from the symmetrical sound waves. Such high sound wave demodulation efficiency leads to good enhancement of the amplitude of the vibration system and excellent acoustic performance.

BRIEF DESCRIPTION OF THE DRAWINGS

In order to more clearly explain the technical solutions in the embodiments of the present application, the following will briefly introduce the drawings required in the embodiments or exemplary technical descriptions. Obviously, the drawings in the following description are only for the application. In some embodiments, for those of ordinary skill in the art, without paying any creative labor, other drawings may be obtained based on these drawings, in which.

DETAILED DESCRIPTION OF THE EMBODIMENTS

Figure 1:
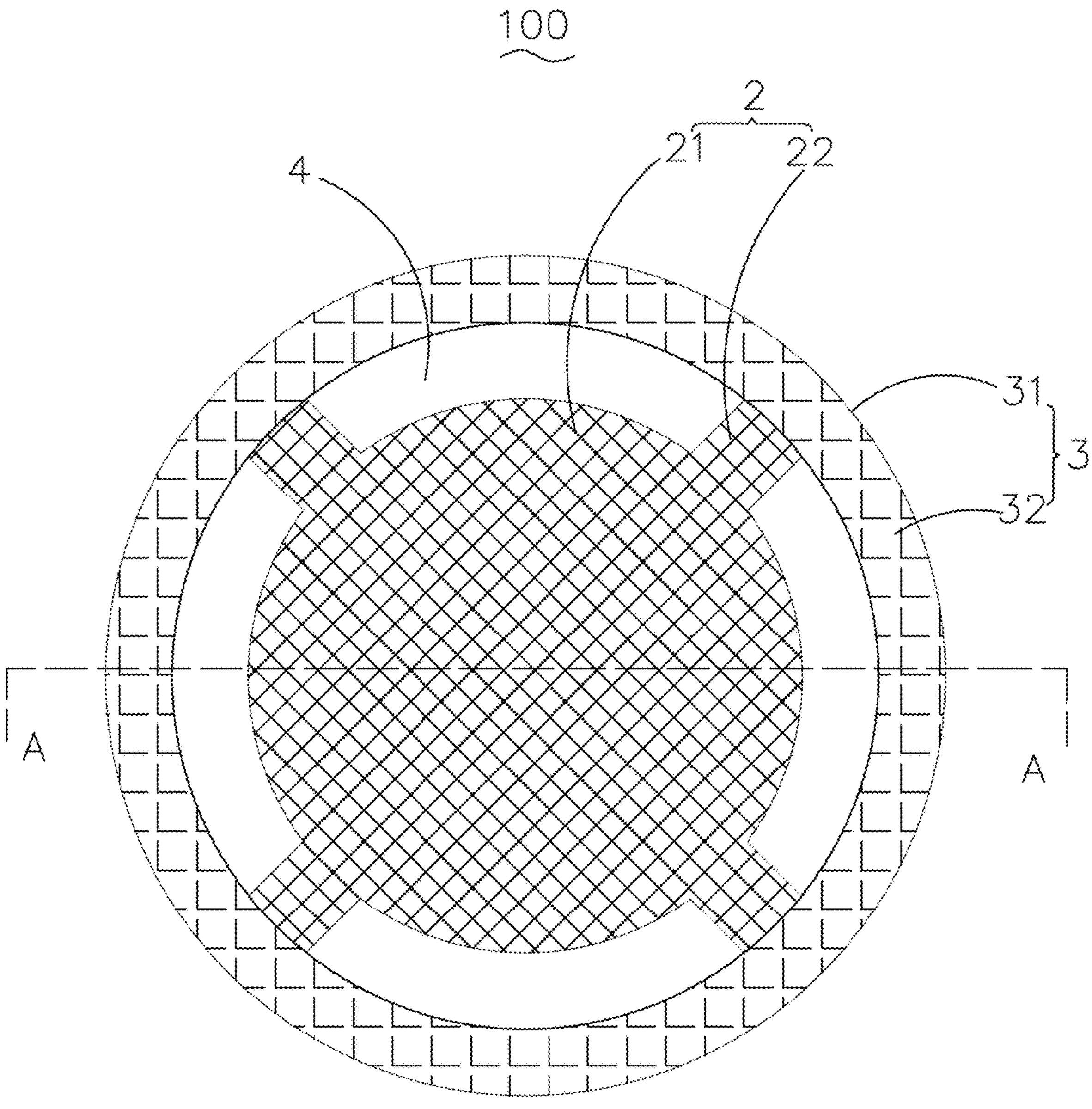
FIG. 1 is a top view of a speaker device in accordance with an embodiment of the present invention.
Figure 2:
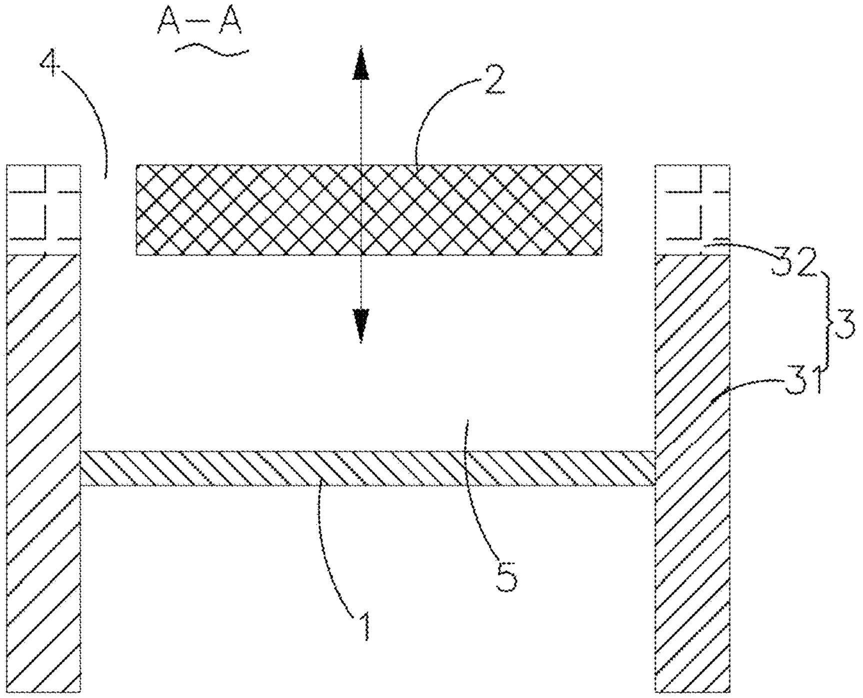
FIG. 2 is a cross-sectional view of the speaker device, taken along line A-A in FIG. 1.
Figure 3:
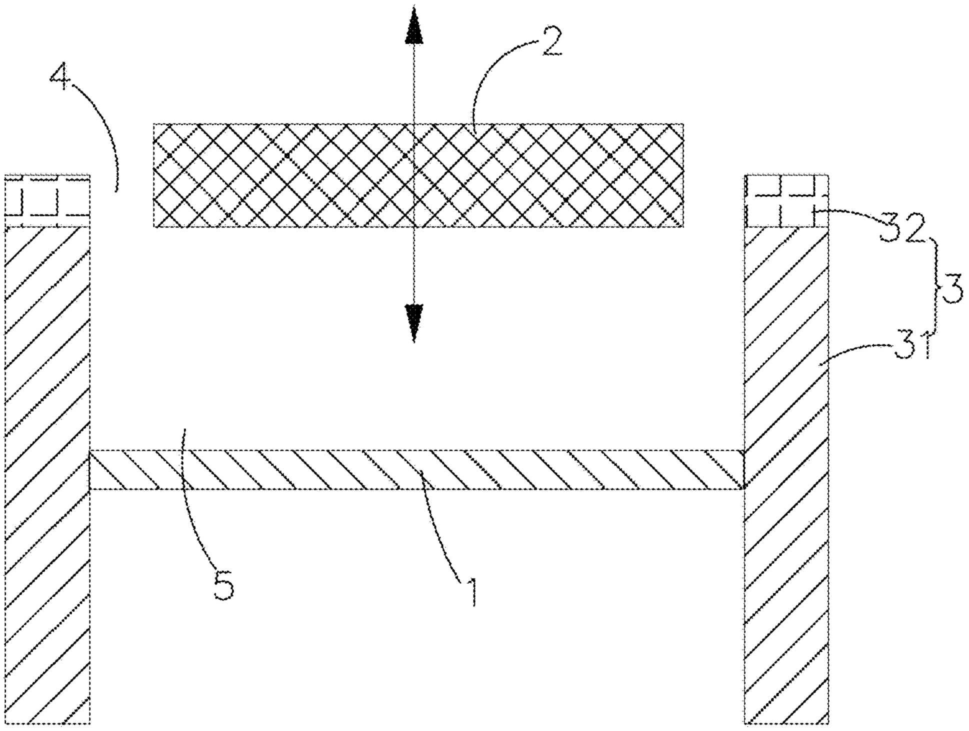
FIG. 3 is a schematic diagram showing an overlap of a demodulation structure and a sound hole provided in the speaker device in FIG. 1.

The following will be taken in conjunction with the accompanying drawings of embodiments of the present invention, The technical scheme in the embodiment of the invention is clearly and completely described, Obviously, the described embodiments are merely part of the embodiments of the present invention, and not all embodiments are based on the embodiments of the present invention, and all other embodiments attained by those of ordinary skill in the art without inventive effort are within the scope of the present invention.

Referring to FIGS. 1-10, the present invention provides a speaker device 100 in the embodiment, wherein the speaker device 100 comprises: a supporting structure 3, an ultrasonic sound emitting unit 1, and a demodulation structure 2.

The supporting structure 3 includes a support body 31 with a sound chamber 5 and a sound hole 32 passing through one end of the support body 31 to the other end. The supporting structure 3 is used to support the fixed ultrasonic amplification unit and demodulation structure 2.

The ultrasonic sound generating unit 1 is located inside the sound chamber 5 and fixed within the support body 31 for emitting modulated ultrasonic waves. Optionally, the ultrasonic sound generating unit 1 is an ultrasonic sound emitting diaphragm structure.

The demodulation structure 2 is located inside the sound hole 32 and fixed to the support structure 3, the demodulation structure 2 is spaced apart from the ultrasonic sound emitting unit 1 along the sound emitting direction of the ultrasonic sound emitting unit 1. The demodulation structure 2 is used to enhance the vibration performance of the speaker device 100.

The demodulation structure 2 includes a diaphragm 21, a fixed part 22 matching the diaphragm 21 extending from the supporting structure 3, and a gap 4 formed between the diaphragm 21 and the supporting structure 3. The demodulation structure 2 vibrates due to the ultrasonic amplitude-modulated ultrasonic wave emitted by the ultrasonic sound emitting unit 1, causing the gap 4 to change and demodulate the modulated sound wave.

Specifically, the ultrasonic sound emitting unit 1 is used to emit amplitude-modulated ultrasonic waves, and the ultrasonic wave pressure acts on the resonant demodulation structure 2, causing the demodulation structure 2 to vibrate, changing the size of the gap 4 formed between the demodulation structure 2 and the sound hole 32, thereby changing the difficulty level of the sound wave flowing out of the gap 4, and then demodulating symmetrical sound waves that are audible; thus achieving high demodulation efficiency of sound waves, good amplification effect of the vibration system, and excellent acoustic performance.

This ensures that the operating frequency of the demodulation structure 2 is the same as the ultrasonic waves emitted by the ultrasonic sound emitting unit 1, greatly improving the demodulation efficiency. At the same time, since the demodulation efficiency is directly related to the amplitude of the demodulation structure 2 (the change in gap 4), the preferred resonant frequency of the demodulation structure 2 is consistent with the carrier frequency of the ultrasonic waves emitted by the ultrasonic sound emitting unit 1, and a vibrating system with a higher Q value is adopted to increase the amplitude.

Under this implementation, the ultrasonic sound unit 1 generates out-of-plane vibration and emits amplitude-modulated ultrasound under the drive of characteristic modulation signals.

In this embodiment, the diaphragm 21 of the demodulation structure 3 vibrates under the action of the amplitude-modulated ultrasound, and the mechanical resonance frequency of the diaphragm 21 is equivalent to the carrier frequency of the amplitude-modulated ultrasound.

The vibration of the diaphragm 21 in this implementation causes a change in the geometric dimensions of the gap 4 in at least one direction, resulting in periodic changes in the acoustic impedance of the gap.

The ultrasonic wave with amplitude modulation changes through the varied gap, resulting in an asymmetric amplitude-modulated ultrasonic wave, which contains the demodulated modulated sound wave.

Figure 4:
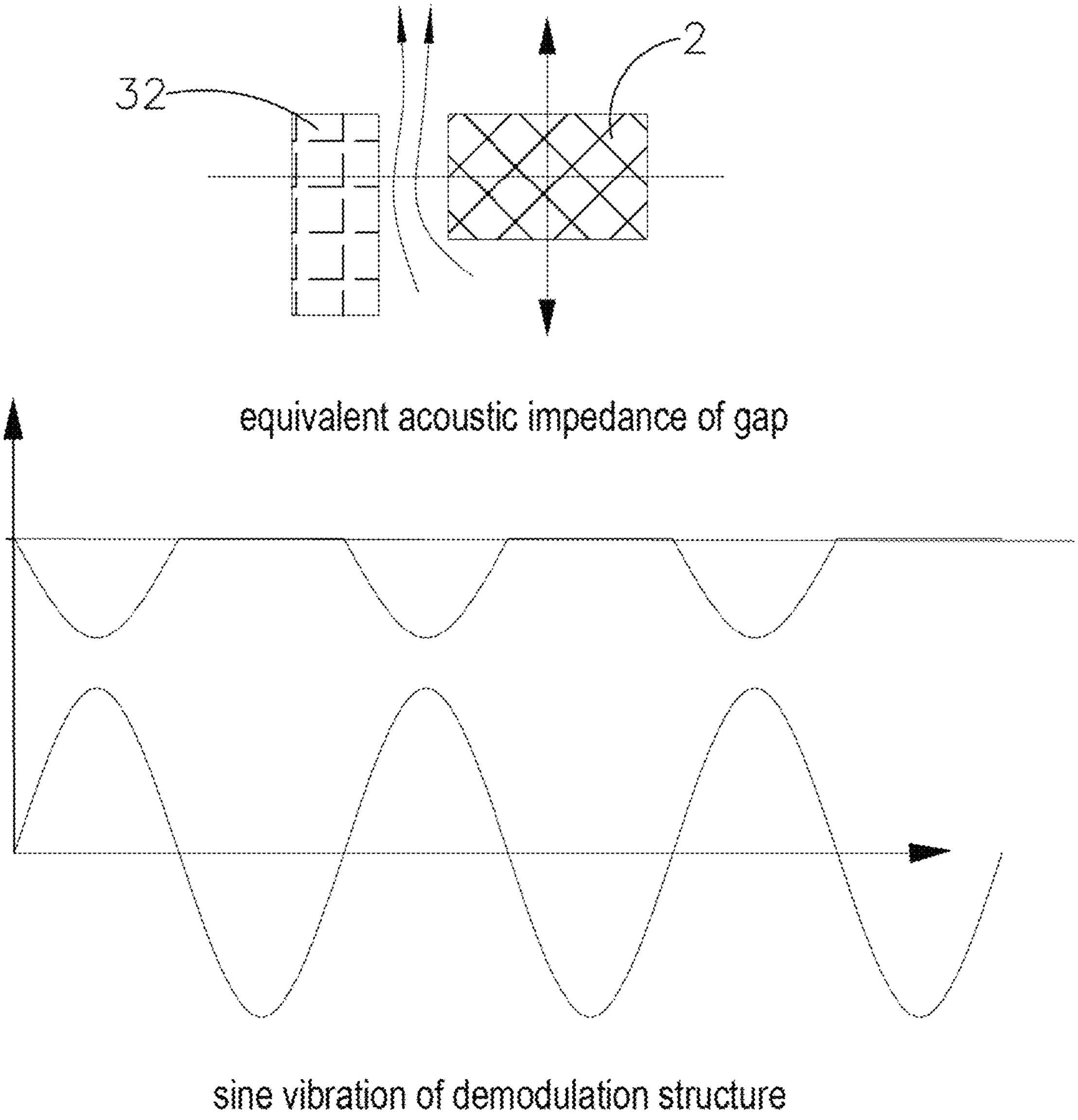
FIG. 4 is an equivalence acoustic resistance diagram of a gap shown in FIG. 2.

In this implementation, the diaphragm 21 is completely located within the range of the sound hole 32 along the normal projection to the sound emission direction. The demodulation structure 2 is positioned with maximum overlap at the initial position of the sound hole 32, where the height of the overlapped gap 4 is the largest. When the demodulation structure 2 undergoes sinusoidal vibration, the equivalent acoustic impedance variation of the gap 4 as shown in FIG. 4 can cause distortion of symmetrical ultrasonic waves, but the distortion will be significant.

Figure 5:
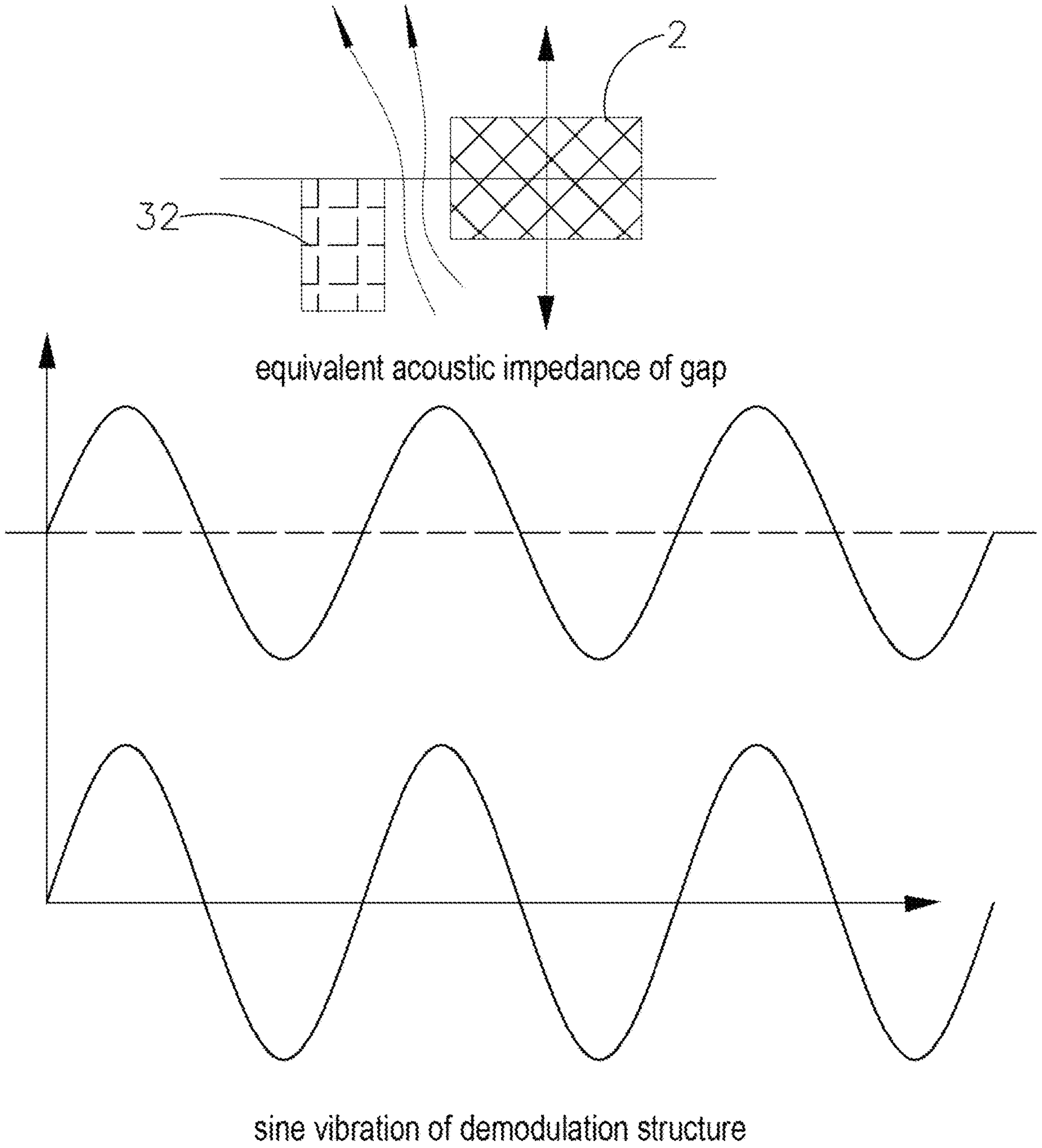
FIG. 5 is an equivalent acoustic resistance diagram of a gap shown in FIG. 3.
Figure 6:
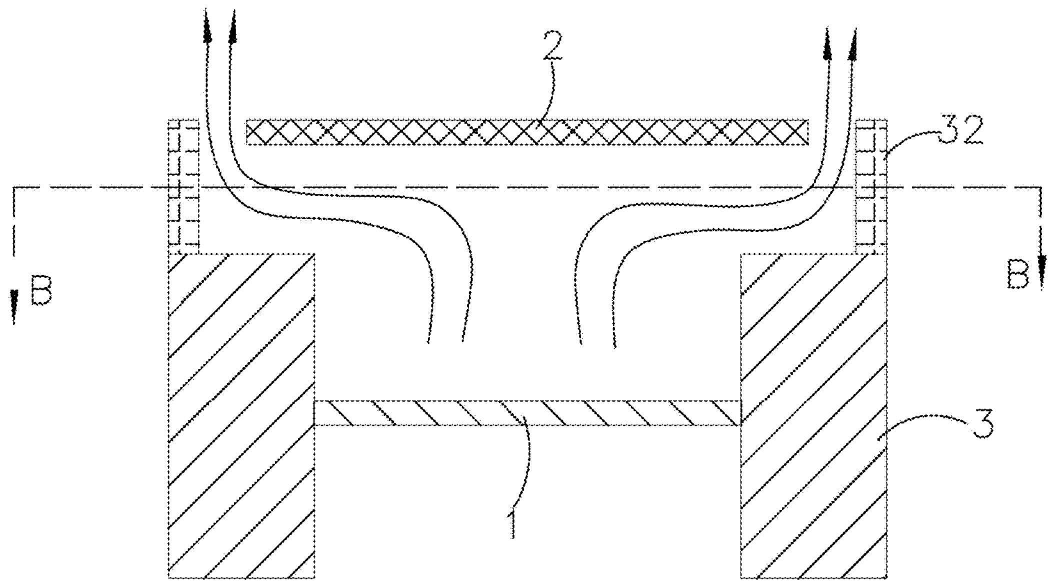
FIG. 6 illustrates a speaker device in accordance with another embodiment of the present invention.
Figure 7:
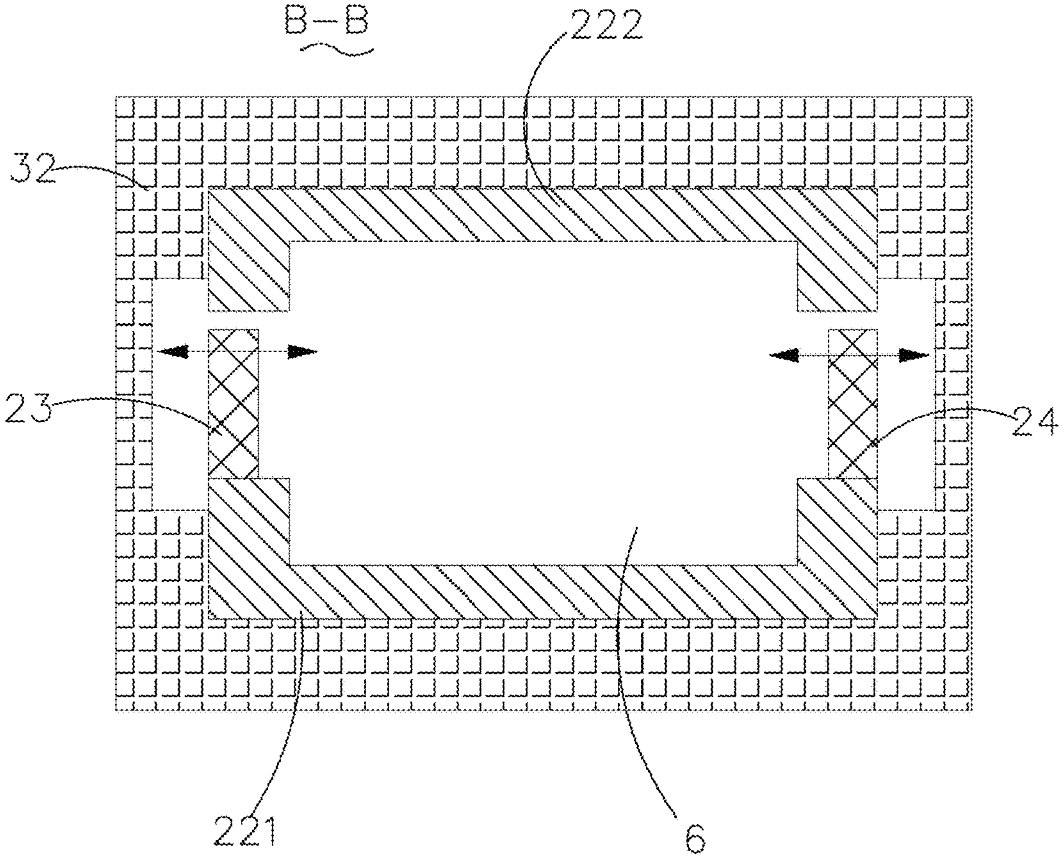
FIG. 7 is a cross-sectional view of the speaker device, taken along line B-B in FIG. 6.
Figure 8:
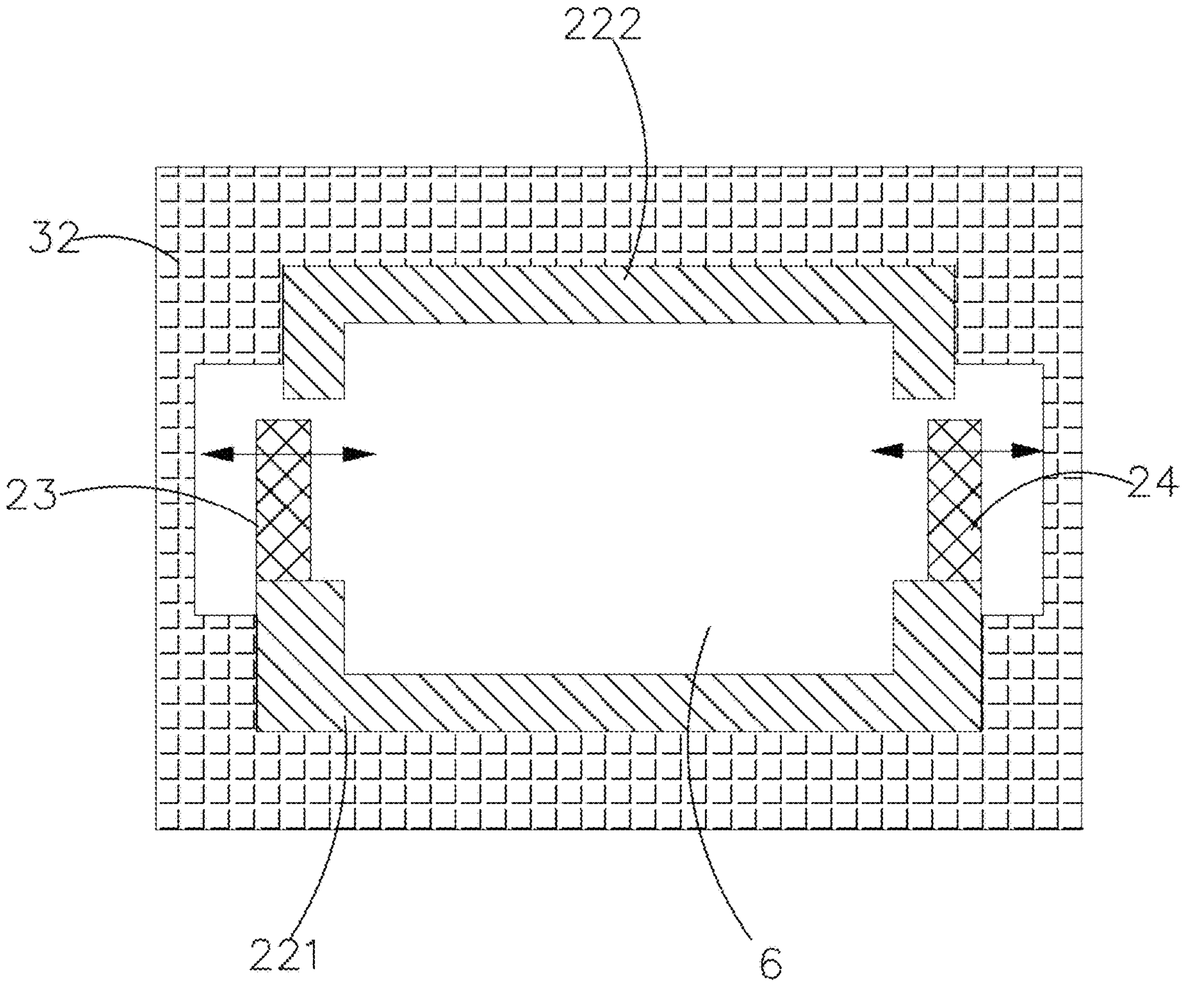
FIGS. 8-10 are assembly schematic diagrams of a demodulation structure provided in the embodiments of the present invention.
Figure 9:
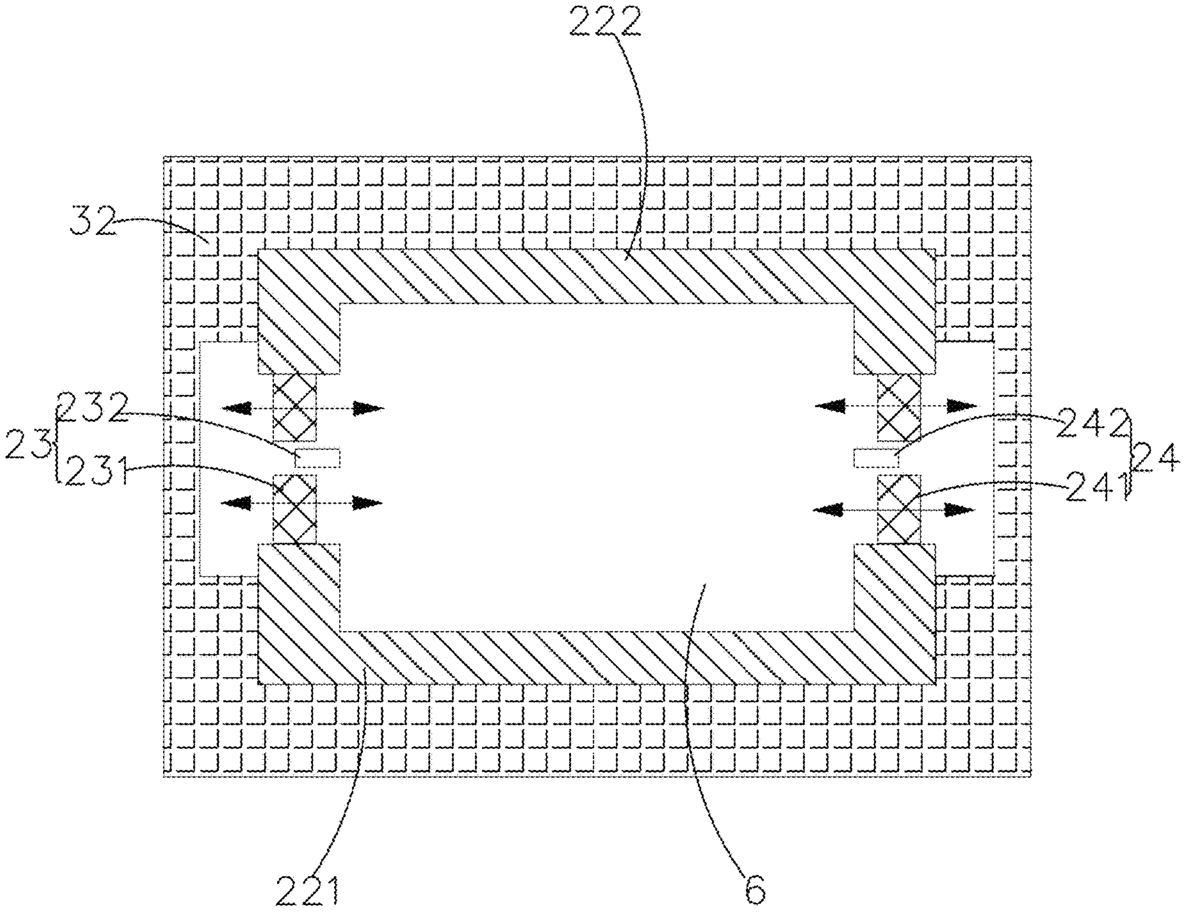
Figure 10:
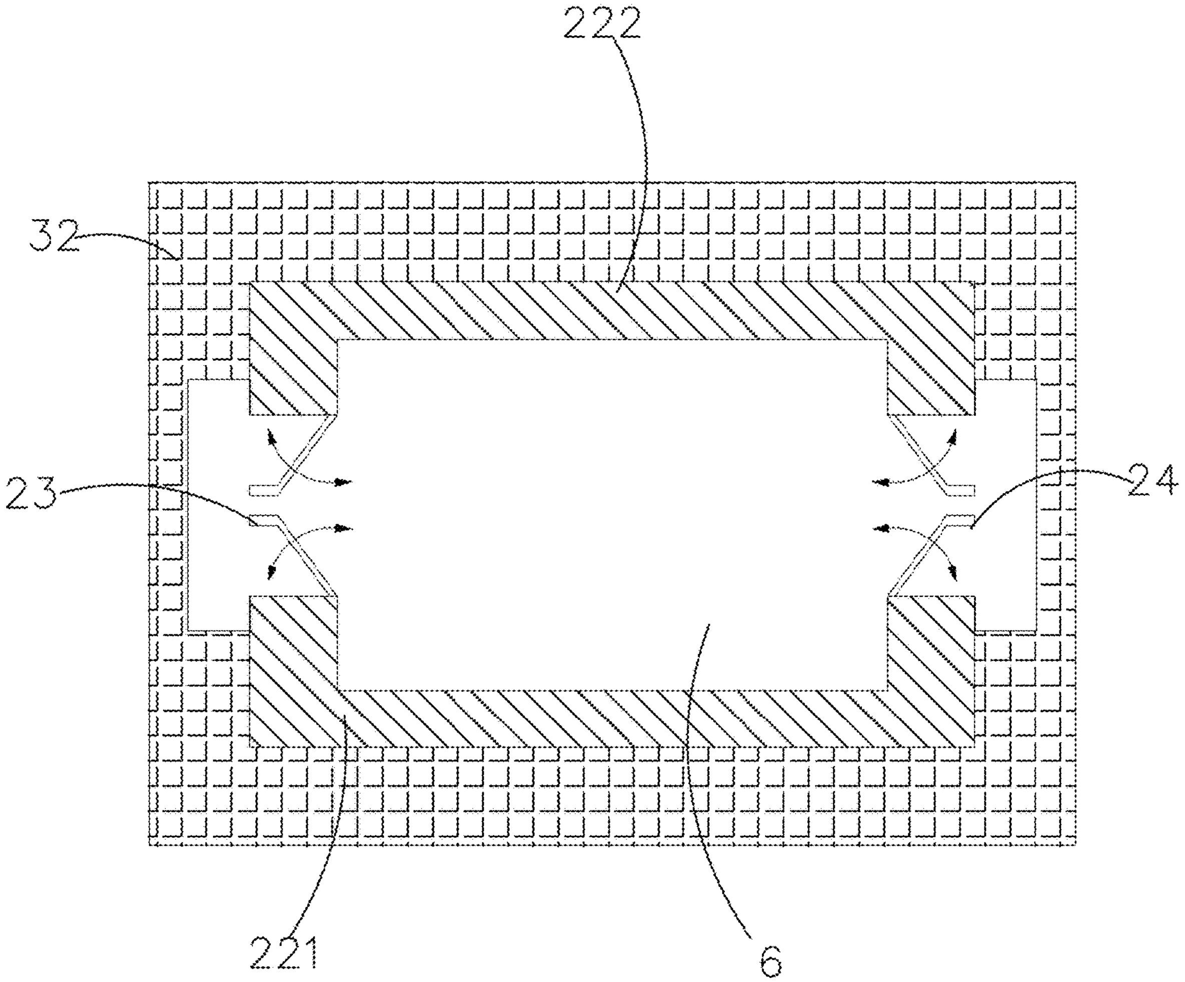

In this embodiment, the diaphragm 21 is positioned such that the projection of the diaphragm 21 along a direction perpendicular to the sound emission direction is within the range of the sound hole 32. By initially aligning the demodulation structure 2 with the sound hole 32 in an overlapping manner at the initial position, the equivalent acoustic impedance of the gap 4 (in a sinusoidal state) will cause distortion of symmetrical ultrasonic waves, as shown in FIG. 5, maintaining minimal distortion and more efficient demodulation, thereby altering the ease of sound waves exiting from the gap 4, and thereby demodulating symmetrical sound waves that are audible.

In this embodiment, the inner diameter of the support body 31 is smaller than the inner diameter of the sound hole 32, and the outer diameter of the sound hole 32 is equal to the outer diameter of the support body 31. The demodulation structure 2 completely covers the ultrasonic sound emitting unit 1 and covers a part of the support body 31. The gap 4, along the emission direction, is completely located on the support body 31 by the positive projection of the support body 31. In this way, placing the demodulation structure 2 directly above the ultrasonic sound emitting unit 1 facilitates overall assembly. Of course, the demodulation structure 2 can also be placed on the side of the ultrasonic sound emitting unit 1, as long as the symmetrical ultrasonic wave that ultimately exits can be demodulated through a variable gap 4, without any corresponding limitation. By keeping the demodulation structure 2 directly above fixed and the sound waves propagating sideways, when encountering the vibrational demodulation structure 2, the resonant frequency matches the carrier frequency of the sound wave, causing it to vibrate, changing the size of the gap 4, thereby modulating audible sound.

In this embodiment, the fixed part 22 includes a first fixed part 221 and a second fixed part 222 fixed on opposite sides of the sound hole 32, and a cavity 6 defined by the first fixed part 221 and the second fixed part 222 together.

The demodulation structure 2 includes a first demodulation structure 23 and a second demodulation structure 24; one end of the first demodulation structure 23 is fixed to one end of the first fixed portion 221, and the other end of the first demodulation structure 23 is spaced apart from one end of the second fixed portion 222 to form a gap 4; one end of the second demodulation structure 24 is fixed to the other end of the first fixed portion 221, and the other end of the second demodulation structure 24 is spaced apart from the other end of the second fixed portion 222 to form the gap 4. Due to the vibration of the demodulation structure 2, the gap 4 between the first fixed portion 221 and the cavity 6 changes.

In this implementation, the first fixed part 221 is symmetrically arranged with the second fixed part 222. This is convenient for increasing the extent of the change in gap 4.

In this embodiment, the two ends of the first demodulation structure 23 are respectively fixed to one end of the first fixed portion 221 and one end of the second fixed portion 222, and the two ends of the second demodulation structure 24 are respectively fixed to the other end of the first fixed portion 221 and the other end of the second fixed portion 222. The first demodulation structure 23 includes two relatively arranged first demodulation bodies 231 and a first block 232 respectively arranged between the two first demodulation bodies 231, with the first block 232 forming two gaps 4 between the two first demodulation bodies 231. The second demodulation structure 24 includes two relatively arranged second demodulation bodies 241 and a second block 242 respectively arranged between the two second demodulation bodies 241, with the second block 242 forming two gaps 4 between the two second demodulation bodies 241.

In this embodiment, the first demodulation structure 23 includes two and relatively set, the second demodulation structure 24 includes two and relatively set, one end of each of the two first demodulation structures 23 is fixed to one end of the first fixed part 221 and one end of the second fixed part 222 respectively; one end of each of the two second demodulation structures 24 is fixed to the other end of the first fixed part 221 and the other end of the second fixed part 222 respectively; a gap 4 is formed between the other ends of the two first demodulation structures 23, and a gap 4 is formed between the other ends of the two second demodulation structures 24.

Optional, the fixed part 22 can be a cantilever beam structure, which provides good support and fixation effects.

In this implementation example, the openings between the two first demodulation structures 23 face in the opposite direction to the openings between the two second demodulation structures 24.

In this embodiment, the supporting structure 3 is a cylindrical structure.

In one optional embodiment of the present invention, a speaker device 100 is provided, wherein the speaker device 100 comprises: a support structure 3, an ultrasonic sound emitting unit 1, and a demodulation structure 2.

The supporting structure 3 includes a support body with a sounding cavity 5 and a sound hole passing from one end of the support body to the other.

The ultrasonic sound emitting unit 1 is located inside the sound chamber 5 and fixed on the inner peripheral side of the support body, for emitting amplitude-modulated ultrasonic waves.

The demodulation structure 2 is located inside the sound hole and fixed to the supporting structure 3, the demodulation structure 2 is spaced apart from the ultrasonic sound emitting unit 1 along the sound hole in front and back.

The demodulation structure 2 comprises a diaphragm 21, a fixed portion 22 matching the diaphragm 21 and extending from the supporting structure 3, and a gap formed between the diaphragm 21 and the supporting structure 3. The modulation sound waves emitted by the ultrasonic sound unit 1 drive the demodulation structure 2 to vibrate, causing changes in the gap which can demodulate the modulated sound waves.

The gap entering and exiting the sound axis of the demodulating structure 2 is orthogonal to the vibration direction of the ultrasonic sound generation unit 1.

Compared with existing technologies, in the speaker device of the present invention, an ultrasonic sound generation unit is fixed on the inner peripheral side of a support body for emitting amplitude-modulated ultrasonic waves; the demodulation structure is located at one end of the sound hole and fixed to the supporting structure, with the demodulation structure spaced apart from the ultrasonic sound generation unit along the emission direction of the ultrasonic sound generation unit; the demodulation structure includes a diaphragm, a fixed portion extending from the supporting structure and matching the diaphragm, and a gap formed between the diaphragm and the supporting structure. The demodulation structure vibrates when driven by the amplitude-modulated ultrasonic waves emitted by the ultrasonic sound generation unit, and changes in the gap lead to the demodulation of modulated sound waves. By emitting symmetrical ultrasonic waves through the ultrasonic sound generation unit, the sound pressure of the ultrasonic waves acts on the vibrating demodulation structure, causing it to vibrate and change the size of the gap formed with the sound hole. This modulation alters the ease with which sound waves flow out of the gap, thereby demodulating audible sound from the symmetrical sound waves. This high sound wave demodulation efficiency leads to good enhancement of the amplitude of the vibration system and excellent acoustic performance.

The foregoing is merely illustrative of embodiments of the present invention, and it should be noted that modifications may be made to those skilled in the art without departing from the spirit of the invention but are intended to be within the scope of the invention.

What is claimed is:

1. A speaker device, comprising:

a support structure having a support body with a sound chamber and a sound hole penetrating through the support body;

an ultrasonic sound emitting unit located in the sound chamber and fixed on an inner peripheral side of the support body for emitting amplitude-modulated ultrasonic waves;

a demodulation structure located at one end of the sound hole, fixed to the support structure, and spaced apart from the ultrasonic sound emitting unit along an emitting direction of the ultrasonic sound emitting unit; wherein the demodulation structure includes a diaphragm, a fixed part extending from the support structure for matching the diaphragm, and a gap formed between the diaphragm and the support structure; and the amplitude-modulated ultrasonic wave emitted by the ultrasonic sound emitting unit vibrates the demodulation structure, causing changes of the gap, which demodulates modulated sound waves.

2. The speaker device as described in claim 1, wherein the ultrasonic sound emitting unit generates out-of-plane vibration driven by a characteristic modulation signal, for emitting an amplitude-modulated ultrasonic wave.

3. The speaker device as described in claim 1, wherein the diaphragm of the demodulation structure vibrates driven by the amplitude-modulated ultrasonic wave, and a mechanical resonance frequency of the diaphragm is substantially equivalent to a carrier frequency of the amplitude-modulated ultrasonic wave.

4. The speaker device as described in claim 1, wherein a vibration of the diaphragm causes a geometric dimension change of the gap in at least one direction, resulting in periodic variations of acoustic impedance of the gap.

5. The speaker device as described in claim 1, wherein the amplitude-modulated ultrasonic wave passes through the changing gap for generating an asymmetrically amplitude-modulated ultrasonic wave containing the demodulated modulation sound waves.

6. A speaker device comprising:

a supporting structure comprises a support body with a sound chamber and a sound hole penetrating through the support body;

an ultrasonic sound emitting unit, located in the sound chamber, fixed on an inner peripheral side of the support body for emitting amplitude-modulated ultrasonic waves;

a demodulation structure located inside the sound hole, fixed to the support structure, and spaced apart from the ultrasonic sound emitting unit along the sound hole; wherein the demodulation structure includes a diaphragm, a fixed part extending from the supporting structure matching the diaphragm, and a gap formed between the diaphragm and the supporting structure; and the demodulation structure vibrates driven by an ultrasonic wave with amplitude modulation emitted by the ultrasonic sound emitting unit, causing changes of the gap which demodulates the modulated sound waves.

7. The speaker device as claimed in claim 6, wherein an exiting-entering sound axis of the gap of the demodulation structure is vertical to a vibration direction of the ultrasonic sound emitting unit.

* * * * *